United States Patent Office 2,959,822
Patented Nov. 15, 1960

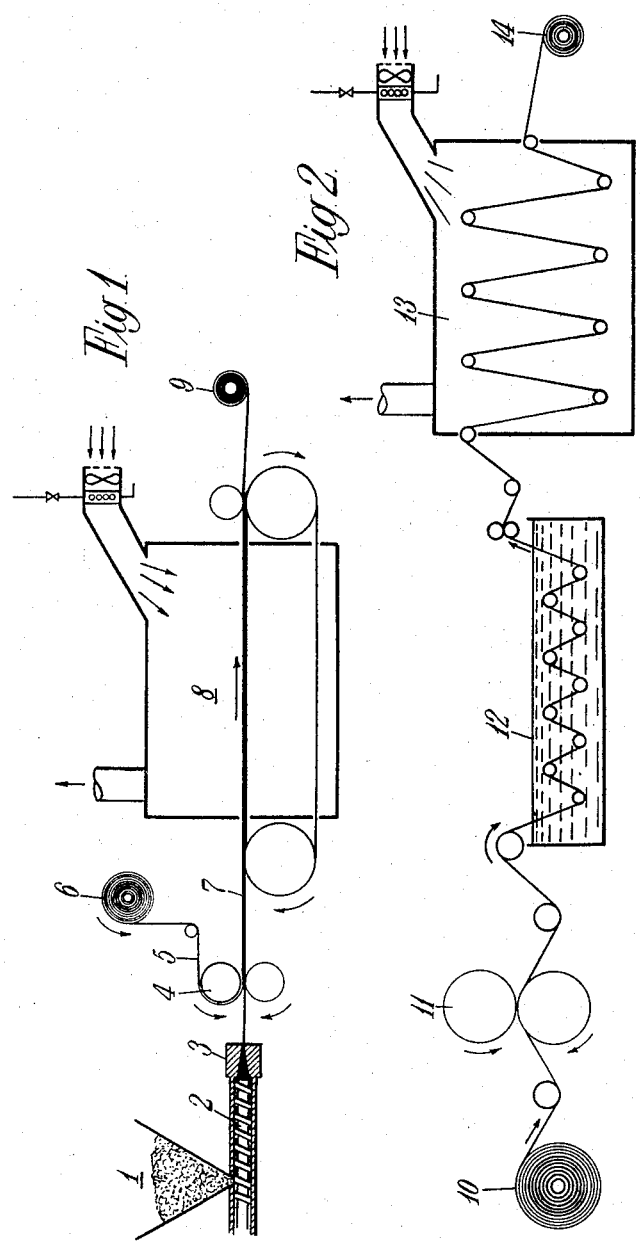

2,959,822

POROUS PLASTIC SHEETING

Eric Maurice O'Conor Honey, Chigwell, Charles Rupert Hardy, South Woodford, London, and Frank Sharp, Gidea Park, Romford, England, assignors to Pritchett & Gold and E.P.S. Company Limited, Essex, England, a British company Filed Feb. 12, 1959, Ser. No. 792,897

Claims priority, application Great Britain Feb. 17, 1958

3 Claims. (Cl. 18—59)

Porous plastic sheeting which possesses a high degree of permeability to gases and water vapour, while being impervious to aqueous liquids can be manufactured by a method which, as applied to plasticised P.V.C. sheeting, for example, consists in dispersing a finely divided water soluble filler into the hot mix of P.V.C. and plasticiser with the aid of a suitable solvent for the P.V.C. in order to facilitate the incorporation of a high proportion of filler. The resultant hot "dough" is sheeted out by any suitable means and the solvent removed at an elevated temperature to leave a plasticised P.V.C. sheet containing a high proportion of water soluble filler. This highly filled sheet is then subjected to considerable mechanical work in the cold by being passed through the nip of a heated simple two-roll calender where the thickness is reduced to one half approximately. The sheet is then rendered porous by dissolving out the soluble filler in water and finally drying.

The mechanical work done on the filled strip by the calendering operation has the effect of forcing the filler particles into contact by breaking through encapsulating membranes of plasticised P.V.C. Prior to the calendering operation the sheet consists essentially of a continuous phase of P.V.C. plasticiser gel in which is dispersed the filler particles, as a discontinuous phase. After calendering, during which the filler particles are brought into contact, two essentially continuous phases, one of P.V.C./plasticiser gel and the other of filler particles, are in coexistence to give a reticulate structure. This change in structure brought about by the calendering operation enables the soluble filler to be rapidly and completely leeched out of the sheet and results in a finished product having a greatly improved permeability to gases and water vapour, in the order of ten times that of a sheet not so calendered. Thus, to achieve a worth-while permeability in a plasticised P.V.C. sheet by the method briefly outlined above, it is imperative that the calendering operation be performed prior to dissolving out the soluble filler. Intensity of the mechanical work done on the sheet during calendering may be gauged by the percentage reduction in thickness or the percentage extension in length of the sheet. The greater the amount of work done on the sheet during this calendering stage, the greater the permeability of the finished product, up to a maximum which occurs when the reduction in thickness or the extension in length is 80% approximately. Beyond this amount very little additional permeability to gases and water vapour is achieved.

Porous plastic sheeting ranging from 5 mil upwards in thickness can be made by this technique, which has a permeability to water vapour of 5,000 gm./m.$^2$/24 hrs. when tested at 38° C. and with a relative humidity of 90% on one side of the sheet while a dry atmosphere is maintained on the other. However, sheeting which possesses such a high permeability is limited in its uses because of its poor tensile and tear strengths, due to the porous structure of the material.

The object of the present invention is to provide simple and effective means for overcoming the aforesaid disadvantage of poor mechanical strength without loss of the desirable high permeability of the resultant porous sheeting.

In accordance with the present invention, we introduce into the sheeted mix which produces the high permeability plastic sheet, a woven, knitted or non-woven textile fabric, so that the two become an integral unit and as such are subjected to mechanical work, as by calendering, to ensure in the finished product a high permeability without any disintegration, of the textile fabric occurring.

We have found the surprising result in carrying out the invention that a relatively small percentage extension during the calendering stage provides a high degree of permeability in such a composite sheeting. Whereas in the manufacture of porous plastic sheeting without fabric reinforcement it is necessary to attain extension in length during calendering of the order of 80% to achieve a high permeability, the composite sheet need only be extended between 4% and 30% to obtain equivalent permeability.

For example, a hot mixture of 100 parts by weight of polyvinyl chloride, 85 parts of polypropylene sebacate, 700 parts of finely divided sodium chloride and 200 parts of dimethyl cyclohexanone is sheeted out and passed through an oven to remove the dimethyl cyclohexanone. The sheet from which this solvent has been removed is then calendered, followed by the leeching out of the salt in water and the final drying of the porous sheet. The permeability to water vapour of the porous sheet does depend upon the amount of extension brought about during the calendering stage, as may be seen from the following readings:

*0.010" thick sheet without fabric reinforcement*

| Extension during calendering, percent: | Permeability, gm./m.$^2$/24 hrs. |
|---|---|
| 0 | 121 |
| 4 | 950 |
| 25 | 3600 |
| 80 | 5000 |

The same plastic mixture sheeted out in accordance with the present invention as a composite sheet with fabric reinforcement and then processed as above gives the following readings:

*0.010" thick sheet with fabric reinforcement*

| Extension during calendering, percent: | Permeability, gm./m.$^2$/24 hrs. |
|---|---|
| 0 | 620 |
| 4 | 2100 |
| 25 | 5250 |

A wide variety of textile fabrics are capable of undergoing sufficient extension during the calendering of the composite sheet without disintegration or appreciable loss of strength. The amount of extension used in the process will necessarily be governed by the inherent extensibility of the fabric used, arising both from the nature of the fibre and the structure of the fabric. For instance, in the examples above, woven nylon tolerates a 25% extension permitting the achievement of about 5000 permeability, whereas woven cotton only tolerates 4% extension on our process, giving the finished composite sheet a permeability of about 2000. In spite of the limitations arising from the nature of the fabric used the permeability which can be achieved by the process of our invention is fully adequate for a wide variety of applications of the product.

In the following detailed description of the method by which our invention is to be carried out, we have selected a composite sheet of plasticised P.V.C. and knitted mesh fabric as a typical example in order to simplify the description, but this is in no way to be regarded as implying any limitation as to the type of plastic material or the type of fabric which may be employed.

We mix together 100 parts of P.V.C. resin, 60 parts of dioctyl phthalate, 700 parts of powdered sodium chloride of particle size range 10 microns to 70 microns and 200 parts of a suitable solvent for the P.V.C., e.g. dimethyl-cyclohexanone at a temperature of 105° C. approximately. The mixing may be carried out in any type of plastic mixing machinery capable of giving uniform dispersion of the salt filler without loss of the solvent, e.g. a steam jacketed internal mixer, screw extruder/compounder, etc. When the mixing cycle is completed the resultant "dough" is extruded from a screw or ram extruder as a sheet of .080" thickness. At this stage the extruded plastic sheet is combined with the knitted mesh fabric by passing the two together through the nip of a pair of small water cooled rolls running at even speeds and which are so adjusted that the composite sheet emerges at a thickness of .020". The best penetration and keying of the fabric into the plastic sheet is obtained by feeding the fabric round the top roll and so controlling the surface temperature of the rolls, by means of the cooling water, that the issuing sheet peels from the top roll.

The solvent such as dimethyl cyclohexanone which has the function of aiding the admixture of the other ingredients is also helpful in providing a good key between the fabric and the plastic mixture. That is why it is an advantageous feature of our invention to introduce the fabric almost immediately the plastic mixture has been extruded. As a further aid to securing a good key between the fabric and the plastic mixture, the top roll of the pair of small calender rolls may have its surface knurled, whereby the fabric is caused to be embedded in the plastic sheet.

The composite sheet is then passed through a tunnel oven operating at 120° C. to 140° C. to remove the dimethyl-cyclohexanone solvent and the sheet cooled to room temperature before reeling on to a spool for convenience of handling. The next and vital stage in the process is to pass the cold sheet through a simple two-roll calender. The temperature of the bottom roll of this calender is maintained at 105° C. approximately and that of the top roll at 95° C. approximately and the sheet is presented to the calender with the fabric surface uppermost so that the plastic surface adheres to and peels from the hotter bottom roll producing a good surface finish. The nip of the rolls is adjusted to produce approximately 20% extension of the sheet which simultaneously suffers a reduction in thickness from .020" to .015" approximately. The feed tension to the calender is adjusted to prevent rippling of the ingoing sheet and the formation of a "bank." After this calendering stage the sheet is leeched in water to remove the salt filler and then dried at 60° C. approximately prior to trimming and reeling up. During the leeching and drying process a further loss of thickness occurs so that the finished product has a thickness of .012" to .013".

Referring to the accompanying explanatory drawings, Figures 1 and 2 show diagrammatically one arrangement of plant to carry out our invention.

In Figure 1 the mixture or mass is fed into the hopper 1 of a screw extruder 2 and is forced through a die 3 as a sheet which is immediately calendered by a light 2-roll calender 4. Passing through the calender at the same time is the reinforcing fabric 5 which is fed from a supply roll 6. The composite sheet of calendered material with its reinforcing fabric 7 passes through an oven 8 to remove the solvent and is then collected on a roll 9.

Figure 2 illustrates the remaining stages of the process starting with a feed roll 10 carrying the same material as that shown on the roll 9 in Figure 1. The material from feed roll 10 is calendered by heavy 2-roll calender 11 and then passes to a water tank 12 where leeching out of the pore-forming ingredient occurs. Finally the sheet is dried in drying oven 13, after which it is collected as a roll 14.

A fabric/plastic sheeting made as described above will posses a high permeability to water vapour, for example 4,000 gr./m.$^2$/24 hrs. or more when measured at 38° C. and with a relative humidity of 90% maintained on one side of the sheet, while a dry atmosphere is maintained on the other. The size of the pores formed in a sheet manufactured by this method will be less than 5 microns and consequently such a sheet will possess a high resistance to penetration by aqueous liquids.

Examples of plastic mix formulations and the fabrics incorporated in them, together with the extension in length achieved during calendering and the resultant permeability of the composite sheet are given below:

(1) Polyvinyl chloride _____ 100
    Polypropylene sebacate _____ 85
    Sodium chloride _____ 700
    Pigments _____ 5
    Dimethyl cyclohexanone _____ 200
    Cotton leno weave fabric:
        Extension in calendering, percent _____ 4
        Permeability _____ 2100

(2) Polyvinyl chloride _____ 100
    Dioctyl phthalate _____ 50
    Sodium chloride _____ 600
    Pigments _____ 5
    Isophorone _____ 150
    Terylene (R.T.M.) knitted mesh fabric:
        Extension in calendering, percent _____ 20
        Permeability _____ 4800

(3) Vinyl chloride/acetate copolymer (5% acetate) _____ 100
    Polypropylene sebacate _____ 85
    Sodium chloride _____ 700
    Pigments _____ 5
    Dimethyl cyclohexanone _____ 200
    Nylon fine woven fabric:
        Extension in calendering, percent _____ 25
        Permeability _____ 5250

The degree of permeability to gases and water vapour can be controlled by the proportions of soluble filler used in the formulation, but since a high permeability is normally required, it is not usual to allow the soluble filler proportion to fall below 400 parts of filler to 100 parts plastic.

The textile fabric may be made from natural, regenerated or wholly synthetic fibres although fabrics made from regenerated or synthetic fibres, since they possess appreciable elasticity, for example, cellulose acetate, nylon and polyethylene terephthalate, are preferred for many applications. Where good drape and flexibility are required in the finished product, a locked mesh construction such as leno-weave or knitted net is most suitable. Fabrics made from crimped synthetic fibres are an obvious choice where great extensibility is required in the finished product. The fabric may be coloured, patterned or printed to obtain a variety of decorative effects.

The very high permeability of the sheeting to water vapour, coupled with its excellent resistance to penetration by aqueous liquids, make it particularly suitable for those applications where it is an advantage for a plastic sheeting to "breathe." The mechanical properties of the composite film can be readily modified by a choice of fabric so that the end uses of such a sheeting are very varied, for example, in wearing apparel, rainwear and upholstery.

The thermoplastic resin used is a member of the group comprising polyvinyl chloride and co-polymers of vinyl chloride with vinyl acetate, vinylidene chloride, acrylonitrile or other similar ethenoid monomers.

We claim:
1. Process for the production of high permeability plastic sheet having considerable tensile and tear strength in which a thermoplastic resin of the group comprising polyvinyl chloride and co-polymers of vinyl chloride with vinyl acetate, vinylidene chloride, acrylonitrile or other similar ethenoid monomers is plasticised and has a finely divided water soluble filler incorporated therein with the aid of a suitable solvent for the thermoplastic resin, the resultant hot dough being sheeted and having thereafter a reinforcing fabric incorporated and keyed in the sheet by passing the sheet and the fabric between cooled rolls which reduce substantially the thickness of the composite sheet, the latter being then heated to remove the solvent, passed through a heavy roll calender having heated rolls which effects a relatively low extension of the order of 4 to 30% of the composite sheet and then through a water tank to remove the water soluble filler, after which the sheet is dried.

2. Process as claimed in claim 1, in which the plastic sheet is applied to the reinforcing fabric in a light two roll calender having the bottom roll heated to a higher temperature than the top roll, the fabric surface being uppermost so that the plastic surface adheres to and then peels off the bottom roll which gives it a good surface finish.

3. Process as claimed in claim 2, in which the plastic mixture is extruded in sheet form before being passed between the rolls of the two-roll calender, the fabric passing first around the upper roll which has its surface knurled and then between the two rolls along with the extruded plastic sheet.

References Cited in the file of this patent

UNITED STATES PATENTS

| | | |
|---|---|---|
| 2,649,391 | Alderfer | Aug. 18, 1953 |
| 2,806,256 | Smith-Johannsen | Sept. 17, 1957 |
| 2,826,509 | Sarbach | Mar. 11, 1958 |

FOREIGN PATENTS

| | | |
|---|---|---|
| 521,527 | Belgium | Aug. 14, 1953 |